Aug. 21, 1951     J. SOMERVILLE     2,564,933
ADJUSTABLE PRESSURE RING FOR DRUMS
Filed Jan. 18, 1946     8 Sheets-Sheet 1

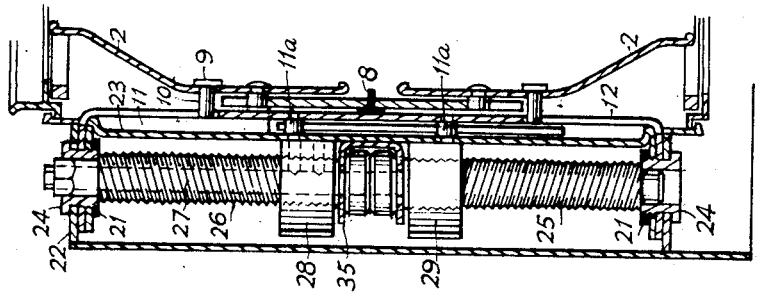
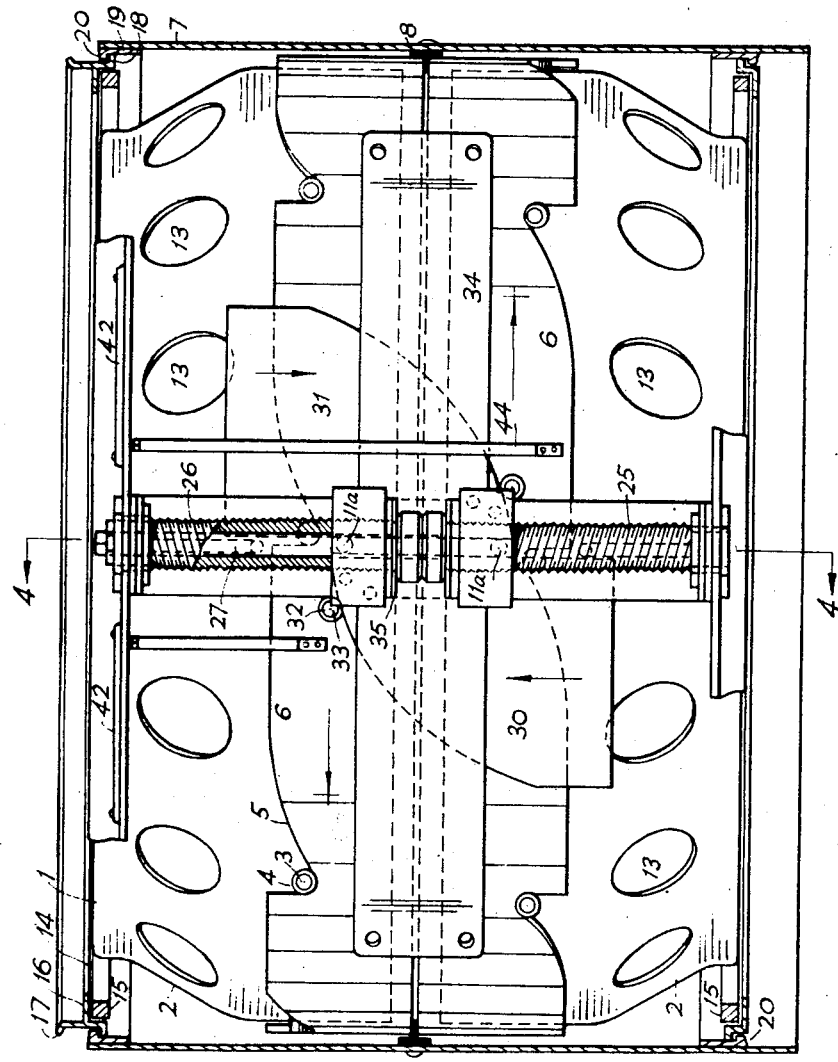

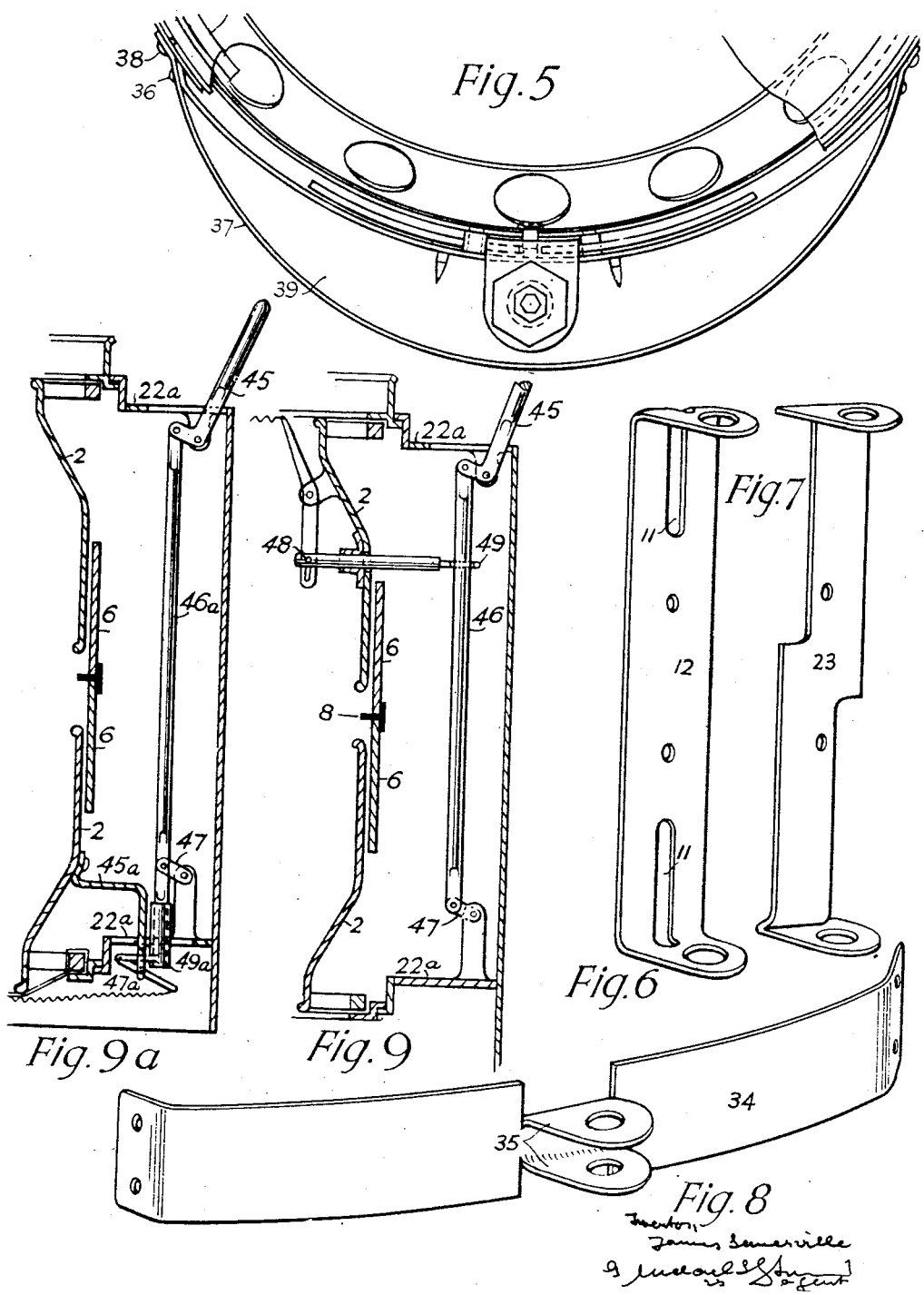

Aug. 21, 1951 J. SOMERVILLE 2,564,933
ADJUSTABLE PRESSURE RING FOR DRUMS
Filed Jan. 18, 1946 8 Sheets-Sheet 4

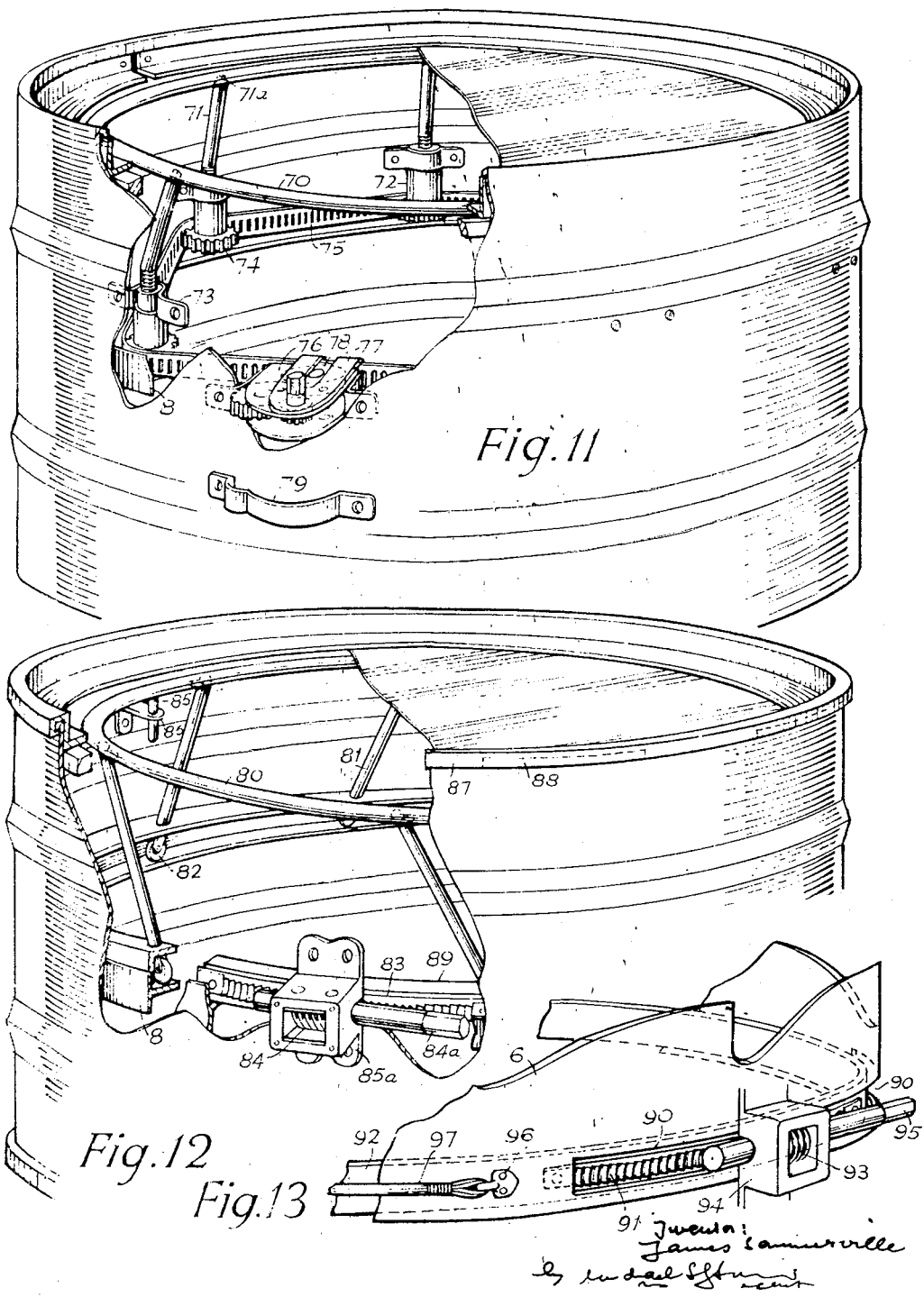

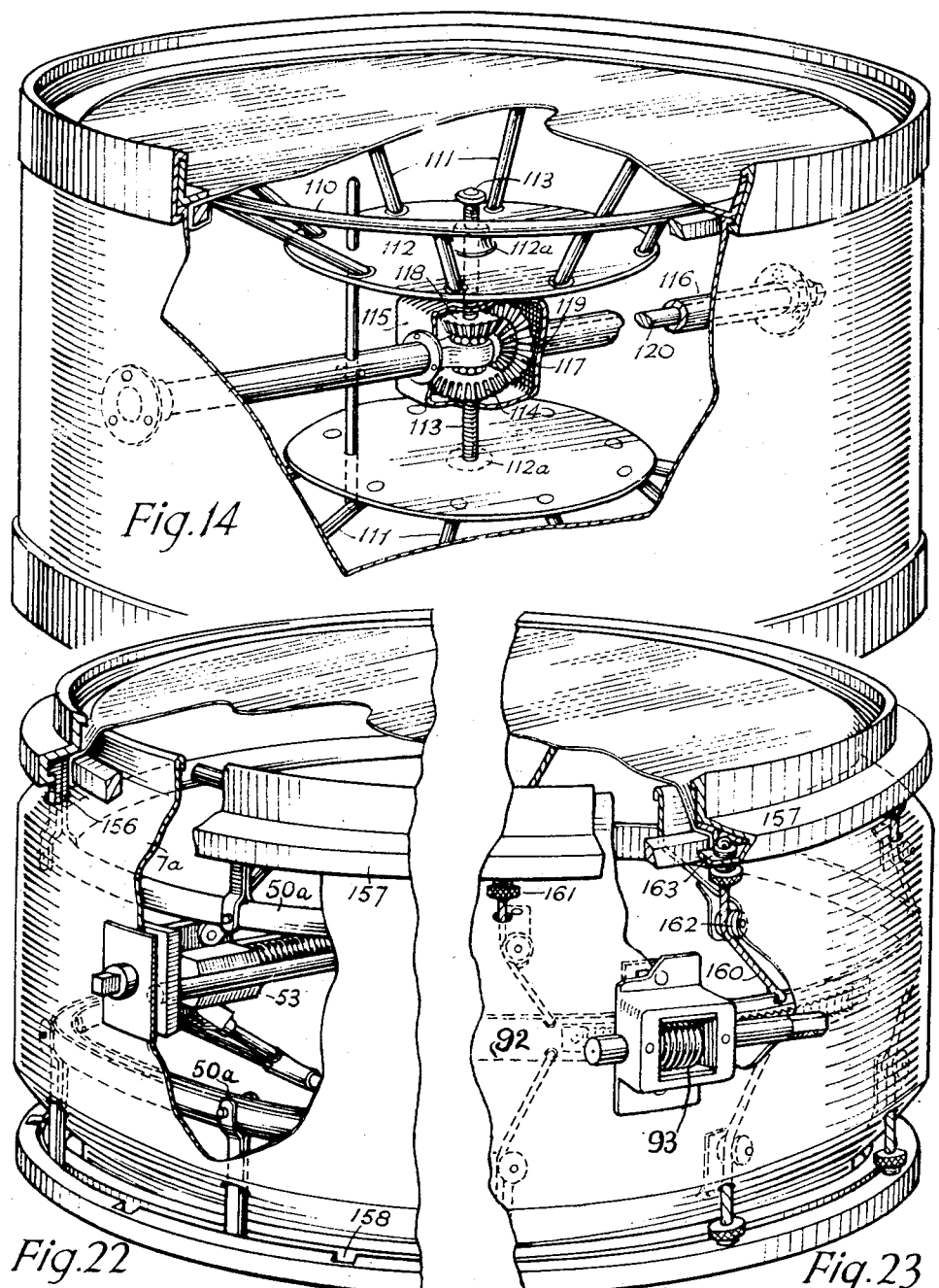

Aug. 21, 1951 J. SOMERVILLE 2,564,933
ADJUSTABLE PRESSURE RING FOR DRUMS
Filed Jan. 18, 1946 8 Sheets-Sheet 7
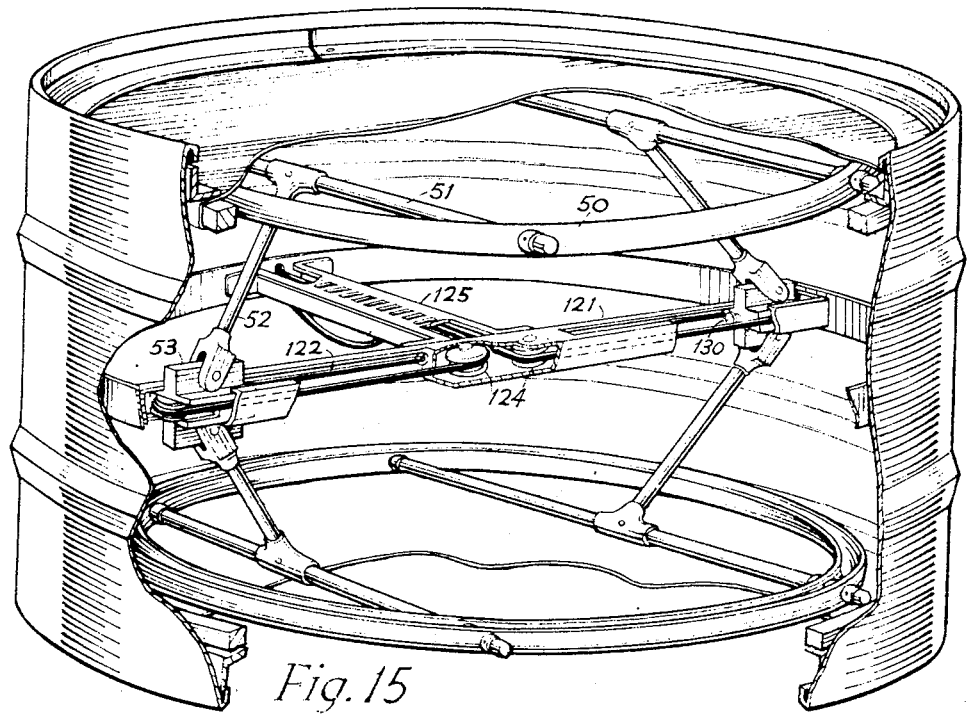
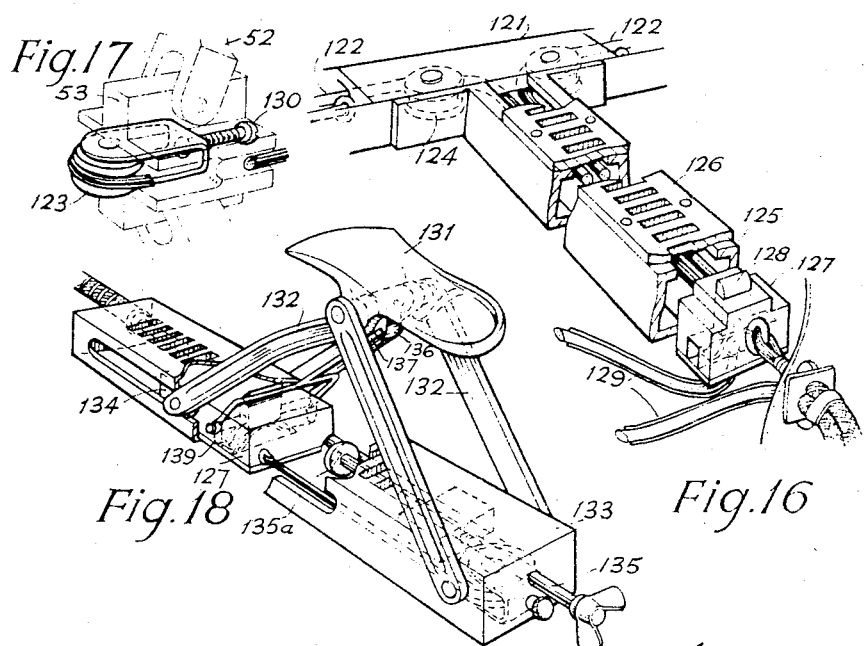

Aug. 21, 1951   J. SOMERVILLE   2,564,933
ADJUSTABLE PRESSURE RING FOR DRUMS
Filed Jan. 18, 1946   8 Sheets-Sheet 8
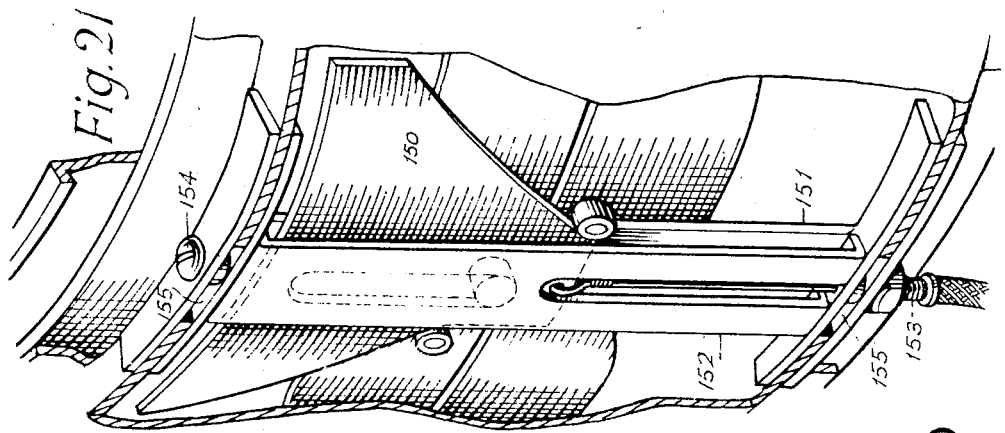
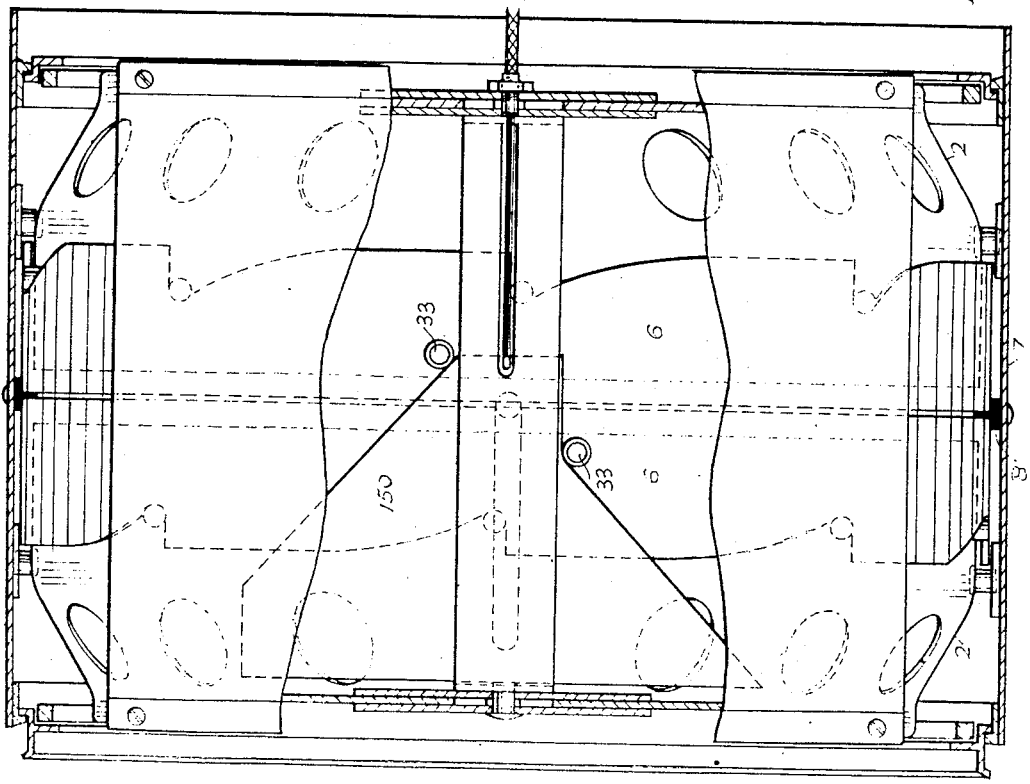

Patented Aug. 21, 1951

2,564,933

UNITED STATES PATENT OFFICE 2,564,933

ADJUSTABLE PRESSURE RING FOR DRUMS

James Somerville, Manchester, England

Application January 18, 1946, Serial No. 641,894
In Great Britain January 26, 1945

13 Claims. (Cl. 84—411)

This invention relates to those mustical instruments and sound-reproducing appliances in which a stretched skin, or similar vibratable material is employed as a resonator or diaphragm, and includes within its scope drums of all sizes and types, and whether single or double-headed. In the ensuing description, reference will be made in the main to double-headed drums, but the invention is not restricted thereto.

Drums according to this invention have many advantages over those hitherto known. These will be better understood after a perusal of the following description, and some of them will be pointed out below.

One object of the invention is to provide an improved method of tensioning the head, involving the use of one or more pressure rings adapted to be forced against the head at a location spaced from the periphery thereof so as to permit of the correct over-tones being produced, this method of tensioning also eliminating much of the strain and distortion to which, in hitherto-known arrangements, the rim of the head is subjected.

Another object is to facilitate the uniform tensioning of the head and to provide for the operation of the tensioning mechanism by a single control member, which may be located remote from the drum.

Another object is to provide for equalization of the pressures on the two heads of a double-headed drum and for the mutual cancellation of the tensioning stresses in the latter.

Another object is to provide an improved construction of drum having the tensioning mechanism arranged internally thereof, and, by eliminating the usual externally projecting fittings, to permit enlargement of the internal capacity of the drum without increasing its overall dimensions.

Another object is to provide for quick detachment of the rim.

A further object of the invention is to provide means for a double adjustment of tension, one adjustment to produce a selected lowest note, which remains constant when made, and a further adjustment for temporarily producing a higher note, the latter adjustment when released allowing the tension to return to its initial value.

A still further object of the invention is to provide an improved locking means for the first of such adjustments.

Any of the above objects may be combined with the provision of means to indicate the degree of tension in the head, and/or with means for so mounting snares and tone-controlling devices (where provided) that the same will main a uniform relationship with the head despite variations in the tension of the latter. Other objects will be apparent from the specification and drawings hereinafter provided.

Various embodiments of the invention will now be described with reference to the accompanying drawings, wherein:

Fig. 3 is a vertical section through a drum embodying the apparatus shown in Fig. 1, and also illustrating one means of securing the head in position, the section being taken on a diametral plane;

Fig. 4 is a vertical section (at right angles to Fig. 3) through one wall of the drum, on the line 4—4 of Fig. 3;

Fig. 5 is a plan of one part of the drum (including the mechanism shown in Fig. 4), with the head partly broken away, and with certain other parts removed for the sake of clearness;

Figs. 6, 7 and 8 are perspective views of detail parts shown in Figs. 1, 3, 4 and 5;

Fig. 9 is a fragmentary sectional view showing one method of mounting snare or damper control mechanisms on the adjustable tensioning means;

Fig. 9A is a similar view showing an alternative method suitable for a lower or bottom snare.

Fig. 11 is a broken perspective view of a part of a drum embodying a further form of the invention, and also illustrating a third means for holding the head in position;

Fig. 12 is a view similar to Fig. 10, but showing a still further form of the invention;

Fig. 13 shows an alternative form of cable-operated mechanism incorporating an angularly-movable member similar to that of Figs. 1 to 8 and providing two adjustments, one of these being permanent and the other capable of returning to its initial position when released.

Fig. 14 is a fragmentary perspective view illustrating yet another modification of the invention.

Fig. 15 is a broken perspective view of a drum having mechanism similar to that of Fig. 10, but operated by cable mechanism for remote control, e. g. by foot pedal.

Figs. 16 and 17 are perspective views of detail parts of Fig. 15, and

Fig. 18 is a perspective view of a foot pedal mechanism for use for example with the means shown in Figs. 13 and 19.

Figs. 20 and 21 show a modification of the mechanism illustrated in Figs. 1 to 8, in which a single wedge operates both tensioning mechanisms simultaneously;

Figs. 22 and 23 are perspective views of halves of a drum (left and right hand respectively), showing two methods of drawing the head over the shell for tensioning purposes using any of the means herein described.

Figure 1:
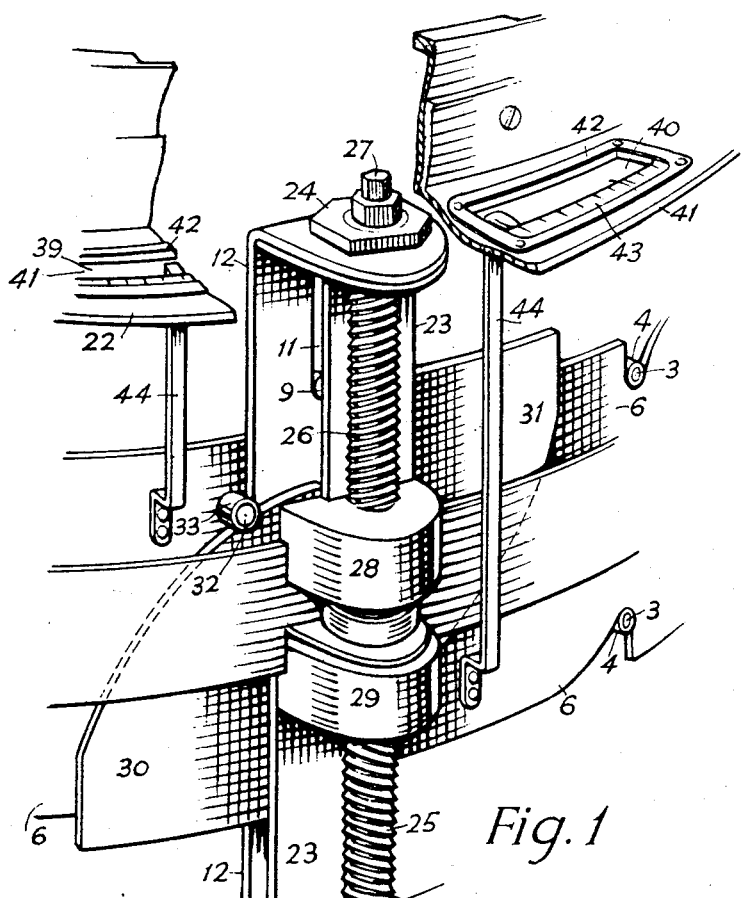
Fig. 1 is a broken perspective view of the operating parts of one form of the invention.

Referring first to Figs. 1 to 8, the pressure ring is constituted by the upper edge 1 of an annular member 2, which member is generally of tapered or conical form, but has its upper and lower margins cylindrical. This annular member 2 carries a number of radially disposed studs 3 on which are freely secured rollers 4, these rollers engaging ramps or cams 5 in the edge of a cam ring 6. The cam ring is rotatably mounted within the drum shell 7, being supported on a T section member 8 secured to the inner face of such shell. The member 2 carries two studs 9 at diametrically opposite points, on which are rollers 10, riding in vertical slots 11 in brackets 12 (hereinafter referred to in detail), the purpose of such rollers and slots being to prevent rotation of the member 2 in relation to the shell 7. The member 2 is apertured at 13 for a purpose mentioned below.

The skin or head 14 is mounted on the flesh hoop 15, which is held below the inwardly-projecting flange 16 on a rim 17 set at a slight angle towards the skin, this rim having an outwardly-directed securing flange 18, which projects below a flange 20 of the flanged ring 19.

When the head is tightened up, by means described below, the two flanges become pressed together and the rim is locked against movement.

The said bracket 12 is secured by means of nuts 21 to upper and lower crescent-shaped plates 22, and within such bracket 12 is a further bracket 23, the two brackets being held together by the nuts 24. These nuts form bearings for co-axial screws 25 and 26 of opposite hand, separated by centrally disposed washers, the screw 25 having a plain extension 27 of reduced diameter passing through the screws 26. The upper extremities of the screw 26 and the extension 27 project beyond the upper nut 24 for engagement with a key when they are to be rotated.

Figure 2:
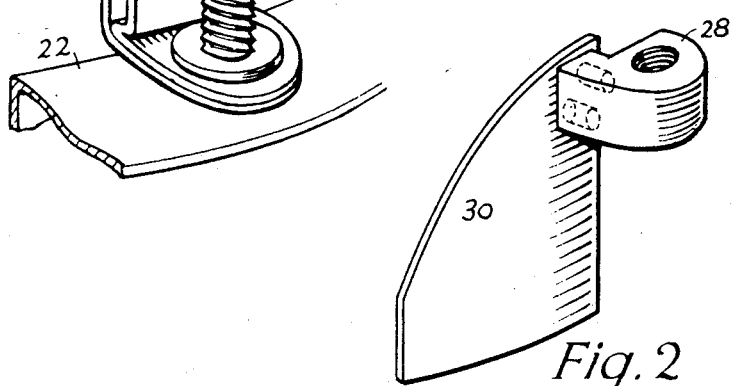
Fig. 2 is a perspective view of a detail part shown in Fig. 1.

Mounted respectively on the screws 26, 25 are nuts 28, 29 secured to wedges 30, 31. These wedges (one of which is shown in Fig. 2 are of arcuate shape in plan view to suit the curvatures of the cam ring 6 and the drum shell 7, and they pass between the vertical parts of the brackets 12 and 23 so as to be guided thereby. Carried by the cam rings 6 are studs 32 bearing rollers 33 which engage the respective wedges 30, 31 in such a manner that, as the screws 25 and 26 are rotated in one direction, the wedges displace the cam rings 6 by means of parts 32, 33, so as to cause the rollers 4 to ride up the ramps 5, thereby elevating the member 2 and pressing the pressure ring 1 against the skin 14. Rotation of the member 2 is prevented by rollers 10 in slots 11 as previously explained. If the screws are rotated in the opposite direction, the wedges retract and the pressure of the skin 14 causes the rollers 4 to return the cam ring 6 to its original position, keeping the rollers 33 in contact with the cams. If desired, anti-friction means may be provided between the cam rings 6 and the supporting member 8, to reduce friction.

The brackets 12 and 23 also carry rollers 11a on studs 11b, which rollers form reaction supports for the rear edges of the wedges.

In order to increase the rigidity of the parts a strap 34 is provided (shown in Fig. 8), having forwardly-extending lugs 35 to embrace the extension 27 of screw 26, and the ends of this strap are secured by rivets or screws 36 to a supplemental shell or cover 37 which encloses the operating mechanism and is itself secured to the main shell 7 by the rivets or screws 38. The space enclosed by this supplemental shell is covered in by the crescent-shaped plates 22. The strap 34 may be connected to the shell 7 instead of the cover 37.

The upper plate 22 is formed with apertures 39, 40, each covered by a transparent material 41 in a frame 42, one edge of the aperture (or the transparent material) being calibrated with a scale 43. Secured to the respective cam rings 6 are pointers 44 extending upwardly so as to cooperate with such scales, whereby the degree of displacement of the cam rings and therefore the degree of tension imparted to the heads, is indicated. The pointers 44 may be of a soft bendable material, or means such as screw-and-nut mechanisms may be provided, for varying the initial position of the pointers on the scale so as to set them at zero, with the initial tension on the head, when the drum is first assembled.

With a construction such as that described the whole interior space of the drum is free from obstruction, so that the sound waves are not interfered with. Moreover, the spacing of the pressure ring radially of the edge of the head, and the aperturing of the member 2, allows production of the correct over-tones.

It will also be noted that with the mechanism applied to the two heads of a drum, reaction pressures are opposed to each other (namely on the T section member 8), so that they very largely cancel out and relieve the stresses on the tensioning mechanism and shell. Fig. 9 shows one method of mounting a snare mechanism on the adjustable tensioning means.

The operating lever 45 is of bell-crank form and has its shorter arm connected to the upper end of a vertical rod 46 whose lower limb is linked at 47 to the adjacent crescent-shaped plate 22a, the arrangement being such that the rod 46 remains vertical during its lateral movement when the lever 45 is operated.

A snare mechanism indicated at 48 is mounted internally of the pressure ring 2 and is actuated through the medium of a horizontal push-rod 49 which is movable through a radial guide in the ring 2, its outer end having an eye through which the rod 46 can slide.

Fig. 9a shows an alternative method of mounting the snare mechanism, which in this case is applied to the lower head of the drum.

Here the vertical rod 46 of the preceding construction is replaced by a longer rod 46a whose lower extremity projects below the plate 22a aforesaid, alongside a dependent bracket 45a carried by the pressure ring 2.

The free end of this bracket carries the snare mechanism 47a which is actuated through the medium of a radial bracket on a sleeve 49a slidably mounted on the lower end of the rod 46a.

It will be appreciated that, with both of these arrangements, the amplitude of the movement imparted to the snare mechanism by oscillation of the lever 45 is unaffected by adjustment of the pressure ring 2 to vary the tension of the head, as the actuating means for the snare mechanism (i. e. the push rod 49 and the bracket sleeve 49a) are free to move axially of the rod 46 or 46a during such adjustment.

Figure 10:
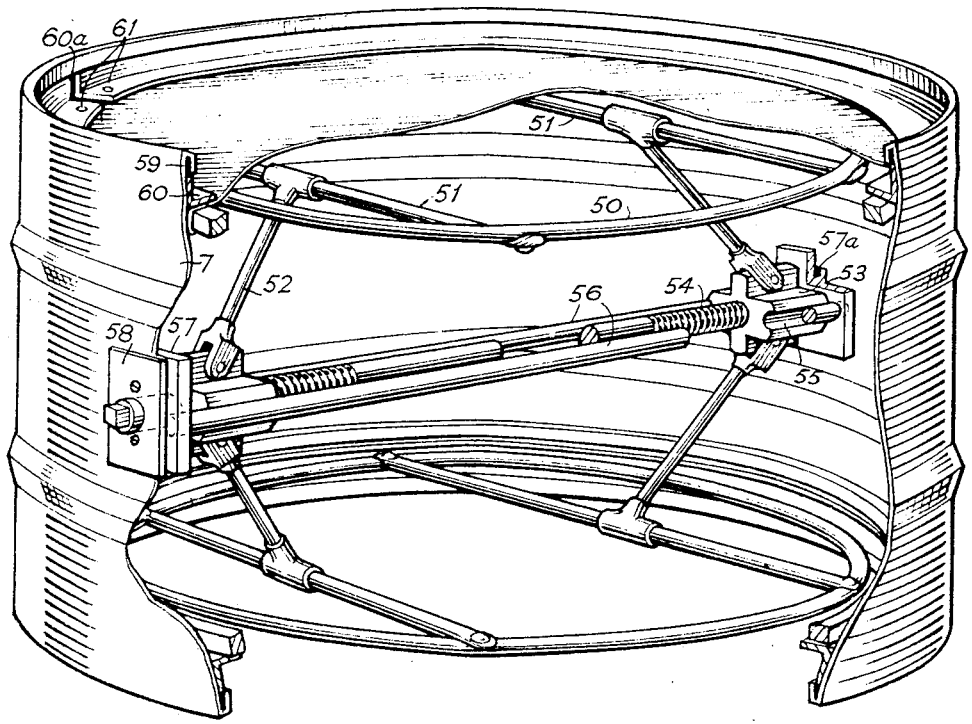
Fig. 10 is a broken perspective view of a drum embodying another form of the invention, and also illustrating a second means for holding the head in position.

Referring now to Fig. 10, the pressure ring is a tubular ring 50 (a solid or flanged ring would be equally applicable) attached to cross members 51, which in turn are pivotally attached to inclined arms 52 pivotally mounted at their other ends on blocks 53 carried by a screwed rod 54, the rod being screwed to opposite hands at its two ends. To prevent any tendency for the blocks 53 to rotate with the screw 54, they are grooved on the sides at 55 to engage guide rods 56 extending across the drum.

The screw 54 and the guide rods 56 are carried in blocks 57 each having a flange 57a to engage the inner face of the shell 7 and an attached plate 58 which engages the outer face of the shell 7, the latter being slotted to allow up-and-down movement of the blocks 57 so that the mechanism may adjust itself to any difference of pressure between the two heads.

In this form of the invention the two heads are tensioned simultaneously by rotation of the single screw 54, one extremity of the screw protruding from the drum for engagement by a key.

The means for holding the head in position comprises the rolled-over edge 59 of the shell 7, below which is the split ring 60, resting on the flesh hoop. Ring 60 is gapped at 60a, and has holes 61 by which the ends may be drawn together to contract the ring sufficiently for its withdrawal out of the rim 59. The said rim 59 is slightly angled on its underside so that the split ring 60 is prevented from inward displacement under pressure.

Instead of the blocks 53 being mounted on a single rod 54, in which case their range of movement is limited, they could be on two side-by-side rods, and be arranged to pass one another across the drum, so that a much larger adjustment movement is possible.

Whilst in the arrangement of Fig. 10 the two heads are tensioned simultaneously, any of the other arrangements described may be adapted for simultaneous operation, so long as the operating mechanism is free to "float" with respect to the shell and adjust itself to any differences in pressure between the two heads. Also, whilst in all the examples shown, a single operating member is required, the invention is not limited to that feature. The pressure ring could be urged against the head by a plurality of adjustment members acting independently around the drum.

In the arrangement shown in Fig. 11, the pressure ring is forced against the head by a number of screw members rotated simultaneously by a flexible toothed member. The pressure ring 70 is mounted on the reduced ends 71a of a number of screws 71, threaded at the lower ends and bent towards the centre of the drum above the threaded parts. The engagement of the ends 71a in the ring 70 is such as to prevent rotation of the members 71. Each member 71 passes through a rotatable nut 72 the lower end of which is domed outwardly to rest on the T section member 8 in the drum shell, and the upper part of which is housed in a clip or saddle 73 secured to the inner face of the drum shell. Also, each nut 72 is formed with, or fitted with a toothed sprocket 74, and the several sprockets mesh with a slotted flexible band 75. Although this band is shown slotted for the whole of its length, it may be slotted only adjacent each sprocket, so long as there are sufficient slots to give the desired amount of rotation of the sprockets. Moreover, instead of a flexible band, a toothed ring may be used, and this may be on the outer or inner sides of the sprockets.

At one point, the band 75 passes between inner and outer U shaped brackets or clips 76, 77, by which it is held in mesh with a driving sprocket 78 forming the last wheel of a train of which the first wheel has its axle extended upwardly to receive a driving key. The clip 76 is secured to the inner face of the drum shell, both the clips passing outwardly through a slot in the shell, and a cover 79 (shown detached) is held in position over the train of wheels, conveniently by the same screws which hold the clips in position, as shown. The outer clip 77 is secured to the inner clip 76. The sprocket 78 may be operated by a worm similar to that shown in Fig. 12.

In this construction, the means for holding the head in position differs slightly from that shown in Fig. 10, in that the rim of the shell is open on the under side and the split ring passes up into it. It is to be understood, of course, that the several ways shown for holding the heads on have no necessary association with the particular tensioning mechanisms appearing in the same figures of the drawings. Any head-securing means may be used with any tensioning means so long as it is adequate to resist the tensioning pressures.

Referring next to Figure 12, there is placed between the T section member 8 and the pressure ring 80, a number of inclined arms 81, the lower ends of which are fitted with rollers 82 (which may be replaced by balls) to run on the member 8, and the upper ends of which are shaped with reduced parts having ball tips, these fitting into keyhole-shaped slots in the under-side of the tubular pressure ring.

The arms 81 pass through the horizontal flange of a rotatable driving ring 89, to which is attached the worm-rack 83, meshing with a worm 84 housed in a bracket 85 carried by the drum shell, the stem 84a of the worm being extended to receive a driving key. The drum shell is slotted to allow the worm and rack to mesh. The pressure ring has a depending part 85, slidable in a yoke or fork 86 carried by the drum shell, to prevent rotation of the ring. As a result, movement of the driving ring, by altering the inclination of the arms, varies the pressure of the pressure ring on the head.

In this figure, the head is retained by its outwardly-folded rim 87, with interrupted lower flange, being passed over the flange 88 on the outer face of the shell, which flange also is interrupted, subsequent relative rotation of the two flanges bringing them one below the other and thereby preventing the rim from being pushed off by the tensioning pressure.

In Fig. 13, an arrangement is shown in which an initial adjustment can be made to obtain a selected lowest note, and, over-riding that, a temporary adjustment can be made for obtaining a higher note, this latter returning to the lowest note position when released. As shown, the cam ring 6 is slotted at 90 to receive a toothed rack 91 carried by a rotatable ring 92, the slot 90 being longer than the rack 91. Engaging the rack 91 is a worm 93 in a housing 94, such worm having a projecting spindle 95 to be operated by a key, and attached at 96, to the cam ring 6, is a cable 97 operated by pedal or lever mechanism (not shown) of any convenient form.

In operation, the rotation of worm 93 advances the rack 91, which pushes against the left-hand end of slot 90 to rotate the cam ring 6 and tension the head, this being a permanent or self-retaining adjustment. If and when the cable 97 is pulled by the operating mechanism (not shown), the cam ring 6 is further advanced to increase the tension, the rack 91 and ring 92 remaining stationary, and when the cable is again released the tension of the head causes the return of the cam ring 6 until the end of slot 90 again engages the end of rack 91. This double-adjustment mechanism is particularly applicable to a Tympani or a Tom-Tom drum.

In the arrangement represented in Fig. 14, there is provided behind the skin or vellum of the batter head a ring 110 of circular shape and of circular cross section, from which extend a number of arms 111 converging together and secured at their inner ends to a plate 112 carrying a nut 112a. Through the nuts 112a passes a screw 113, carrying a bevel wheel 114, and arranged rotatably but non-slidably in a holder 115 supported rigidly from the drum shell. A hollow radial spindle 116 in the drum, carried in bearings on said holder and in the shell, has at its inner end a further bevel wheel 117 meshing with the wheel 114 on the screw 113, and is provided at its outer end with means to receive a key by which it may be rotated. Rotation of the spindle traverses the nut along the screw to increase or decrease the pressure of the ring on the skin The mechanism above described affects the snare head. For the batter head there is a similar arrangement of arms 111, plate 112 and nut 112a and screw 113, and such screw carries a bevel wheel 118 meshing with a wheel 119 on a spindle 120 which passes through the hollow spindle 116. Spindle 120 projects beyond spindle 116 so that either spindle may be rotated by means of a suitable key.

Referring now to Fig. 15, an arrangement of toggle arms is shown similar to that in Fig. 10 but operated by cable instead of by screw mechanism. As shown, the blocks 53 are slidably mounted in a hollow guide 121 slotted at the top and bottom. Secured to the guide 121, near its centre, are the ends of two cables 122 which pass around pulleys 123 on the respective blocks 53 and further pulleys 124 rotatably mounted in the guide 121, then through lateral extension 125 of the guide, and finally out through the shell of the drum. As shown more clearly in Fig. 16, the extension 125 aforesaid has a slotted cover plate 126 and slidable therein is a block 127 having an upstanding latch member 128 which is held in the raised position by a bow spring beneath it. As the block 127 is pulled outwardly by the cable, the latch 128 enters successive slots to hold the mechanism in tension and prevent its return. Further, a supplementary cable 129 is provided for retracting the latch member 128, so as to allow the return of block 127, when it is required to release the tension. The latch or locking mechanism may alternatively be incorporated in the foot pedal as shown in Fig. 18.

Fig. 17 is a detail view of block 53 carrying the pulley 123 and shows an adjusting screw 130 for moving the pulley on the block to tension or slacken the cable.

One form of mechanism for operating the cables is shown in Fig. 18. There is a foot pedal 131 mounted on toggle arms 132, one of which arms is fixedly attached to a casing 133 having a slotted top, whilst the other is attached to a sliding block 134 in such casing 133 and fitted with a latch mechanism similar to that shown in Fig. 16. The arrangement is such that tilting of pedal 131 withdraws and advances the latch whilst depression and raising of the pedal, after unlatching it, increases and decreases the tension in the head. An adjustable stop screw 135 is provided in casing 133 the head 135a of which limits the backward movement of block 134.

Figure 19:
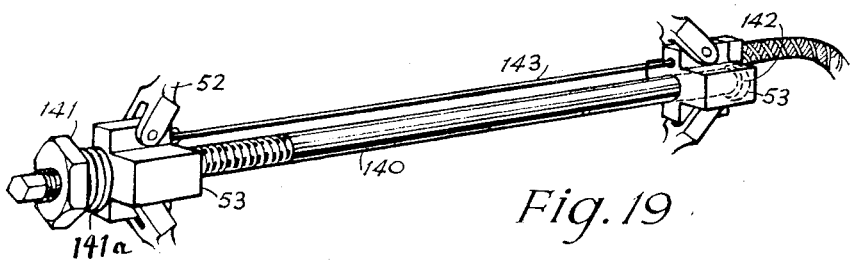
Fig. 19 shows a mechanism corresponding to that of Fig. 13, but in which the direction of the adjustment is transversely of the drum instead of rotary.

Referring next to Fig. 19, an alternative form of cable adjustment for the arms 52 is shown. In this case blocks 53 are slidably mounted on a rod 140, one end of which is screwed to receive a nut 141, and the other end of which carries a fixed head 142. By rotation of nut 141 blocks 53 are drawn together to give an initial tension, this being a permanent adjustment for selecting a desired lowest note, whilst by pulling on cable 143 the blocks 53 may be further drawn together to temporarily obtain a higher note, and when released return to the lowest note position determined by parts 141, 142. A buffer spring 141a is also provided.

Referring to Figs. 20 and 21, the two cam rings 6 mounted as in Fig. 1 to operate pressure members 2 and reacting on an intermediate T section member 8 on shell 7, are opened simultaneously by a double wedge 150. This wedge is held between guides 151 and 152 and engages the rollers 33 on the respective cam rings. A Bowden cable mechanism 153 is provided for advancing the wedge, which results in the two cam rings 6 being rotated in opposite directions for simultaneous tensioning of the two heads. Above the wedge 150 is an adjustable stop screw 154 to limit the return movement. The guides 151, 152, carrying with them the wedge 150 and the cable mechanism, are movable for a short distance around the drum in slots 155, so that the wedge may centralise itself to produce equal pressures on the two heads. This construction may be combined with a pedal adjustment mechanism such as is shown in Fig. 18 with suitable modifications, or other remote control mechanism may be adopted.

Finally, Figs. 22 and 23 show two methods of tensioning a drum by pulling the rims down over the edge of the shell, by mechanism within the latter. In Fig. 22 a mechanism similar to that of Fig. 10 is employed, except that the tensioning mechanism operates by the separation of the blocks 53 instead of by bringing them together. A ring 50a corresponding with the pressure ring 50 of Fig. 10 lies below an inwardly-swaged part of the shell 7a, and is connected by members 156 passing through that part of the shell to the rim 157. The connection of the rim 157 to the members 156 is by means of the slots 158 in the rim, these slots first passing on to the outwardly-turned ends of parts 156, and the rim then being slightly rotated to prevent removal of the parts.

In Fig. 23 a worm and rack arrangement is shown, similar to that of Fig. 13, and the rotating ring 92 is connected by flexible members 160 to the rim 157, such flexible members passing out of the shell at the inwardly swaged part 7a. Each flexible member 160 is separately adjustable by the nuts 161, and they all move together to tension the ring upon rotation of the worm 93. Suitable guide rollers 162 are provided for the flexible members 160. In this case the rim has a return flange 163 to which the flexible members are attached.

In any of the constructions outlined above, where the operating mechanism exerts a thrust, modifications may be made in which such mechanism exerts a pull, there being pivoted members somewhere in the mechanism to convert the pull into a thrust on the ring or hoop. Also, in either case, the mechanism for one head may interlace that for the other, to reduce the angle between the thrust members (if of a radial disposition) and the head.

Among the outstanding advantages of this invention are the absence of local strains on the drum and its hoops, such as is caused by the existing tensioning screws and results in warping or twisting; the elimination of the numerous metal fittings hitherto required for tensioning; thereby making the drum easy to handle and to clean, and allowing of a lighter construction of shell; the invention allows of the addition of other accessories to the shell of the drum since there is ample room for these, and gives a truer clearer note owing to the equal distribution of the tension stresses and the single tensioning member, whilst for marching bands the mechanism is protected from the weather and the drums, being smaller in overall dimensions (as compared with a drum of known type having same diameter of head) are easier to handle.

In all cases where the pressure ring is applied to the inner faces of the heads, the shell is placed in tension. This permits the use of a much thinner material for the shell than is the case with the known arrangements which put the shell in compression, and in fact a material may be used which is sufficiently thin to have distinct resonant and vibratory qualities. In an extreme case, the shell itself may be formed of a flexible skin, of a similar material to the heads, and will then act as a supplementary head.

Instead of the single central mechanism for operating the tensioning mechanisms for both skins of the drum simultaneously, such central mechanism may be duplicated for separate operation of the tensioning mechanism for each skin.

It should be mentioned that the spacing of the pressure ring inwardly of the rim, besides giving the required overtones in the head, also permits of the latter being safely tensioned to a much greater degree than has been possible hitherto, whilst allowing it to vibrate freely, so that a correspondingly higher note is obtained.

What I claim is:

1. A musical drum, comprising in combination, a peripheral wall constituting a shell; at least one vibratory head; stationary means for fixedly suspending said vibratory head at its rim from said shell at substantially one end of the latter; a pressure ring; a first set of movable elements; a support for said first set of movable elements inside said shell; means for moving said first set of movable elements on said support in opposite radial directions with respect to said shell; a second set of movable elements connected to said pressure ring; and arms, having one end pivoted to said movable elements of said first set and the other end connected to said movable elements of said second set whereby an axial movement is imparted to said pressure ring upon radial movement of said movable elements of said first set and whereby said pressure ring may be brought into variable abutment with the inner face of said head.

2. A musical drum, comprising in combination, a peripheral wall constituting a shell; at least one vibratory head; stationary means for fixedly suspending said vibratory head at its rim from said shell at substantially one end of the latter; a pressure ring; a rod extending diametrically through said shell and being revolvable therein; oppositely threaded portions provided at opposite end portions of said rod; a pair of internally threaded movable elements disposed on said threaded portions so as to be movable in opposite directions upon revolving of said rod; and means connecting said movable elements with symmetrical portions of said pressure ring whereby an axial movement may be imparted to said pressure ring and said pressure ring may be brought into variable abutment with the inner face of said head.

3. A musical drum, comprising in combination, a peripheral wall constituting a shell; a pair of vibratory heads; stationary means for fixedly suspending said vibratory heads at their rims from said shell at substantially opposite ends of the latter; a pair of pressure rings; a pair of toggle links, the outer ends of each of said toggle links being connected to opposite pressure rings; a pair of radially movable supports providing a fulcrum for each of said toggle links; and means for imparting simultaneous movement to said supports in opposite direction so as to impart simultaneous axial movements in opposite directions to said pressure rings whereby said pressure rings may be brought into variable abutment with the inner faces of said two heads.

4. A musical drum, comprising in combination, a peripheral wall constituting a shell; a pair of vibratory heads; stationary means for fixedly suspending said vibratory heads at their rims from said shell at substantially opposite ends of the latter; a pair of pressure rings; a pair of toggle links, the outer ends of each of said toggle links being connected to opposite pressure rings; a pair of radially movable supports providing a fulcrum for each of said toggle links; flexible means for imparting simultaneous movement to said supports in opposite direction so as to impart simultaneous axial movements in opposite directions to said pressure rings whereby said pressure rings may be brought into variable abutment with the inner faces of said two heads; and releasable latch means for locking said movable supports in selected positions.

5. A musical drum including the combination, with a continuous peripheral wall forming a hollow shell with at least one open end, of at least one vibratory head covering the latter end; stationary means for fixedly suspending the vibratory head at the peripheral portion thereof from the shell at said one end; a pressure ring disposed in said shell within said vibratory head; a pair of oppositely inclined arms terminating at a first end of each in a plane substantially parallel to, and spaced a predetermined distance from said vibratory head; means connecting the other ends of the arms to the pressure ring; and operable means for simultaneously moving the first ends of said arms radially in opposite directions with respect to said shell and substantially in said plane whereby to impart axial movement to said pressure ring and bring the latter into variable contact with said vibratory head.

6. A musical drum including the combination, with a continuous peripheral wall forming a hollow shell with two opposite open ends, of two vibratory heads covering the latter open ends; stationary means for fixedly suspending the vibratory heads at the peripheral portions thereof from the shell at said ends; a pair of pressure rings spaced apart in said shell and disposed individually within said vibratory heads; a pair of oppositely inclined arms connected at a first end of each to each pressure ring, with one pair disposed at one side of a plane intermediate both vibratory heads and the other pair disposed at the other side of the same plane; and operable means movable substantially in said plane and effective upon operation to move the other ends of each pair of said arms in radially opposite directions with respect to said shell whereby to impart axial movement to said pressure rings and bring the latter into variable contact with said vibratory heads.

7. A musical drum including the combination, with a continuous peripheral wall forming a hollow shell with two opposite open ends, of two vibratory heads covering the latter open ends; stationary means for fixedly suspending the vibratory heads at the peripheral portions thereof from the shell at said ends; a pair of pressure rings spaced apart in said shell and disposed individually within said vibratory heads; a plurality of portions inclined in one direction with respect to the shell and connected to one pressure ring at one side of a plane located intermediate the two pressure rings; a further plurality of portions inclined in another direction with respect to said shell and connected to the other pressure ring at the other side of said plane; movable operating means within said shell intermediate the two ends thereof operably disposed with respect to all of the inclined portions connected to said pressure rings, said movable operating means being effective upon movement thereof to displace said pressure rings axially in mutually opposite directions whereby to bring said pressure rings simultaneously into variable contact with said vibratory heads; and means for effective movement of said movable operating means.

8. A musical drum including the combination, with a continuous peripheral wall forming a hollow shell with two opposite open ends, of two vibratory heads covering the latter open ends; stationary means for fixedly suspending the vibratory heads at the peripheral portions thereof from the shell at said ends; a pair of pressure rings spaced apart in said shell and disposed individually within said vibratory heads; a pair of arms connected at a first end of each arm to each pressure ring and inclined outwardly therefrom toward an intermediate portion of the shell, with one pair of arms disposed at one side of a plane located intermediate both vibratory heads and the other pair of arms disposed at the other side of the same plane; and means diametrically movable with respect to said shell substantially in said plane for simultaneously varying the inclination of all of said arms, whereby to bring said pressure rings into variable content with said vibratory heads.

9. A musical drum including the combination, with a continuous peripheral wall forming a hollow shell with two opposite open ends, of two vibratory heads covering the latter open ends; stationary means for fixedly suspending the vibratory heads at the peripheral portions thereof from the shell at said ends; a pair of pressure rings spaced apart in said shell and disposed individually within said vibratory heads; a pair of arms connected at a first end of each arm to each pressure ring and inclined outwardly therefrom toward an intermediate portion of the shell, with one pair of arms disposed at one side of a plane located intermediate both vibratory heads and the other pair of arms disposed at the other side of the same plane; a pair of movable blocks connected to the other ends of said arms, with one arm of each pair pivotally connected to one block and the other arm of each pair pivotally connected to the other block; means for guiding said blocks along a diametrical path with respect to said shell in said plane; and movable means for moving said blocks simultaneously in opposite directions along said diametrical path and thereby altering the inclination of all of said arms, whereby to bring said pressure rings into variable contact with said vibratory heads.

10. A musical drum including the combination, with a continuous peripheral wall forming a hollow shell with two opposite open ends, of two vibratory heads covering the latter open ends; stationary means for fixedly suspending the vibratory heads at the peripheral portions thereof from the shell at said ends; a pair of pressure rings spaced apart in said shell and disposed individually within said vibratory heads; a pair of arms connected at a first end of each arm to each pressure ring and inclined outwardly therefrom toward an intermediate portion of the shell, with one pair of arms disposed at one side of a plane located intermediate both vibratory heads and the other pair of arms disposed at the other side of the same plane; a pair of movable blocks connected to the other ends of said arms, with one arm of each pair pivotally connected to one block and the other arm of each pair pivotally connected to the other block, both blocks having a threaded hole therethrough; and a rotatable feed screw with two opposite threads thereon extending diametrically with respect to said shell through said blocks in said plane, with the two threads on the feed screw meshing with the threaded holes in said blocks, said feed screw upon rotation thereof simultaneously moving said blocks in opposite directions thereon and thereby altering the inclination of all of said arms, whereby to bring said pressure rings into variable contact with said vibratory heads.

11. A musical drum including the combination, with a continuous peripheral wall forming a hollow shell with two opposite open ends, of two vibratory heads covering the latter open ends; stationary means for fixedly suspending the vibratory heads at the peripheral portions thereof from the shell at said ends; a pair of pressure rings spaced apart in said shell and disposed individually within said vibratory ends; a pair of arms connected at a first end of each arm to each pressure ring and inclined outwardly therefrom toward an intermediate portion of the shell, with one pair of arms disposed at one side of a plane located intermediate both vibratory heads and the other pair of arms disposed at the other side of the same plane; a pair of movable blocks connected to the other ends of said arms, with one arm of each pair pivotally connected to one block and the other arm of each pair pivotally connected to the other block; means for guiding said blocks along a diametrical path with respect to said shell in said plane; movable means for moving said blocks simultaneously in opposite directions along said diametrical path and thereby altering the inclination of all of said arms, whereby to bring said pressure rings into variable contact with said vibratory heads; and means for latching the movable means and blocks in attained position.

12. A musical drum including the combination, with a continuous peripheral wall forming a hollow shell with two opposite open ends, of two vibratory heads covering the latter open ends; stationary means for fixedly suspending the vibratory heads at the peripheral portions thereof from the shell at said ends; a pair of pressure rings spaced apart in said shell and disposed individually within said vibratory heads; a pair of arms connected at a first end of each arm to each pressure ring and inclined outwardly therefrom toward an intermediate portion of the shell, with one pair of arms disposed at one side of a plane located intermediate both vibratory heads and the other pair of arms disposed at the other side of the same plane; a pair of movable blocks connected to the other ends of said arms, with one arm of each pair pivotally connected to one block and the other arm of each pair pivotally connected to the other block; a fixed elongated supporting member diametrically disposed within the shell for supporting and guiding said blocks; rollers remotely spaced apart and individually mounted for rotation on the two movable blocks; a pair of additional rollers spaced apart in the intermediate portion of the supporting member; a pair of opposite flexible elongated elements secured at one end of each to said supporting member and individually extending outwardly to and over the rollers on said blocks and inwardly therefrom to and over the rollers on said supporting member and from the latter rollers out through the wall of the shell substantially at right angles to said supporting member to an accessible position externally of said shell, the externally accessible portion of said flexible elongated elements upon being manipulated and tensed effecting simultaneous movement of both blocks toward each other with consequent increase in the inclination of all of said arms and axial movement and increased pressure contact of said pressure rings with said vibratory heads; and latching means for retaining said elongated elements and blocks in attained position.

13. A musical drum including the combination, with a continuous peripheral wall forming a hollow shell with two opposite open ends, of two vibratory heads covering the latter open ends; stationary means for fixedly suspending the vibratory heads at the peripheral portions thereof from the shell at said ends; a pair of pressure rings spaced apart in said shell and disposed individually within said vibratory heads; a pair of arms connected at a first end of each arm to each pressure ring and inclined outwardly therefrom toward an intermediate portion of the shell, with one pair of arms disposed at one side of a plane located intermediate both vibratory heads and the other pair of arms disposed at the other side of the same plane; a pair of movable blocks connected to the other ends of said arms, with one arm of each pair pivotally connected to one block and the other arm of each pair pivotally connected to the other block, one block having a plain hole therein and the other block having a threaded hole in the same; a rotatable shaft diametrically disposed in respect to said shell extending through both blocks and having a thread on one end meshing with the threaded hole in the other block, said one block having an additional hole parallel to the plain hole therein; an operating cable extending from an accessible position exteriorly of said shell through the wall thereof and through the additional hole in said one block to the other block and being secured thereto; and a hollow flexible tubular cover for the operating cable extending from the additional hole in said one block and exteriorly of said shell, the rotation of said shaft and variation of the tension of said operating cable to alter the position thereof with respect to the tubular cover effecting simultaneous opposite movement of said blocks with consequent alteration of the inclination of all of said arms and opposite axial movement of both pressure rings whereby to bring the latter into variable contact with said vibratory heads.

JAMES SOMERVILLE.

REFERENCES CITED

The following references are of record in the file of this patent:

UNITED STATES PATENTS

| Number | Name | Date |
|---|---|---|
| 769,527 | Bahr | Sept. 6, 1904 |
| 1,233,881 | Iucci | July 17, 1917 |
| 2,061,244 | Au-Miller | Nov. 17, 1936 |
| 2,074,193 | Strupe | Mar. 16, 1937 |

FOREIGN PATENTS

| Number | Country | Date |
|---|---|---|
| 22,329 | Great Britain | Nov. 1, 1905 |
| 342,951 | Germany | Oct. 25, 1921 |